Patented Oct. 7, 1952

2,613,223

UNITED STATES PATENT OFFICE 2,613,223

HYDROXYLATION OF OLEFINIC COMPOUNDS

Donald Peter Young, Sanderstead, England, assignor to The Distillers Company Limited, Edinburgh, Scotland, a British company No Drawing. Application January 14, 1949, Serial No. 71,027. In Great Britain February 5, 1948

2 Claims. (Cl. 260—535)

The present invention refers to a process for the hydroxylation of unsaturated compounds and relates in particular to the introduction of two hydroxyl groups into olefinic compounds whereby the latter are converted into saturated compounds containing at least two hydroxyl groups.

It is known that di-hydroxy compounds wherein the hydroxy groups are in the alpha-beta position can be produced by the interaction of hydrogen peroxide and compounds containing olefinic linkages, and that the reaction can be catalyzed by small amounts of oxides or per-acids of certain metals. Osmium oxides are known to be the most active of these catalysts, but their scarcity and toxicity prevent their use in industry. Treibs in Brennstoff-Chemie 1939, vol. 20, page 358, has stated that such heavy metal oxides would come into consideration as catalysts which with hydrogen peroxide form per-acids which are rich in oxygen and soluble in solvents for the olefines used such as acetone and methanol. As a further essential condition for a satisfactory catalytic action he stipulates that the peroxide oxygen ought to be liberated with great ease. He states that of the three per-acids which he mentions namely per-acids of vanadium, molybdenum and tungsten, only the pervanadic acid fulfils these two conditions, whereas the acids of tungsten and molybdenum although combining with hydrogen peroxide give off their peroxidic oxygen with difficulty only.

In British Patent No. 508,526 a method for producing glycols and other hydroxy compounds is described according to which ruthenium tetroxide, vanadium oxides, chromic anhydride and molybdenum oxide are used in conjunction with hydrogen peroxide, but in this specification as well as in U. S. Patents No. 2,402,566 and No. 2,414,385 the reaction is described as being carried out in an anhydrous medium. As the commercially available hydrogen peroxide, however, contains considerable quantities of water, the preparation of the reaction medium with the necessary removal of water is a process which requires several stages for its accomplishment and is therefore cumbersome. In addition, the last named specifications state that the temperatures most advantageous for carrying out the hydroxylation reaction lie between several degrees below 0° C. and room temperature (e. g. 21° C.). When, however, the reaction is carried out with the above-named heavy metal oxides, the reaction velocities obtainable are low. Moreover, we have found that a very large and even predominant part of the olefinic compound serving as one of the reactants is simultaneously transformed into undesired products. These side reactions take place even at room temperature, and become greater in extent with an increase of the temperature. An added complication is that vanadium oxides and chromium oxides catalyse the oxidation of organic solvents such as methanol or tertiary butanol by the hydrogen peroxide used so that such solvents are unsuitable for use as diluents in the presence of these catalysts.

It has been found that the hydroxylation of compounds with one olefinic linkage can be carried out readily and with good yields by bringing said olefinic compounds in contact with aqueous hydrogen peroxide in the presence initially of tungsten oxide and/or molybdenum oxide at temperatures between about 50° C. and about 100° C., preferably 60° C. and 80° C.

The reaction according to this invention may be carried out in aqueous solution with or without the presence of an inert organic water-miscible diluent i. e. such diluents as are stable to the oxidising influence of hydrogen peroxide in the presence of tungsten oxide or molybdenum oxides. Such diluents are for instance acetone, tertiary butanol, dioxane or the like. The possibility of using such diluents is the more surprising as most of these diluents are readily attacked and oxidised by hydrogen peroxide in the presence of vanadium oxide or pervanadic acid whereas they remain substantially unchanged when tungsten oxide or molybdenum oxide are used therewith as catalysts. Another diluent which may be used with advantage is acetic acid which may be transformed into peracetic acid as an intermediate product in the course of the reaction.

Olefinic compounds which may be hydroxylated in accordance with the process of this invention are for instance hydrocarbons such as n-oct-1-ene, cyclohexene, but-1-ene, 2:4:4-trimethylpent-1-ene, 2:4:4-trimethylpent-2-ene, 4-ethylpent-2-ene and the like; alcohols such as allyl alcohol, crotyl alcohol, but-3-en-2-ol, pent-3-en-2-ol, 4-methylpent-4-en-2-ol and the like, olefinic acids such as acrylic acid, crotonic acid, maleic acid and the like. Olefinic aldehydes such as acrolein, crotonaldehyde and the like may also be hydroxylated according to the process of this invention but they may be oxidised simultaneously to their corresponding acids.

As British Patent No. 508,526 already mentioned especially warns against the application of temperatures above room temperature when hydroxylation of the reacting olefinic compounds is aimed at, it was not to be expected that hydroxylated compounds can be obtained with excellent yields by the process of this invention, the amount of by-products through side reactions at the elevated temperature being very much smaller than those obtained at room temperatures with for instance vanadium oxide.

The catalysts actually present in the reaction mixture when tungsten oxide or molybdenum oxide are used according to the process of this invention, are probably the respective metallic per-acids or higher oxides which are formed when these oxides are treated with and dissolved in aqueous hydrogen peroxide.

The quantity of the metal oxide added as catalyst may vary within wide limits. 1 to 4 grams of tungsten oxide or about 3 to 4 grams of molybdenum oxide per 1 gram/molecule of hydrogen peroxide give good results. The most advantageous amount can easily be ascertained by experiment.

It has been found, furthermore, that when acetic acid is used as a diluent, the yield of hydroxylated compound may be improved considerably and in some cases the reaction time shortened, by first heating the acetic acid with the hydrogen peroxide for some time, say one hour at 80° C., and then dissolving in the solution thus prepared the requisite amount of tungstic oxide and/or molybdic oxide. This mixture is then reacted with the olefinic compound to be hydroxylated at a suitable temperature, for instance between 50° and 80° C. Alternatively, it has been found that a similar improvement may be attained by the further addition of a very small amount of sulphuric acid to the reaction mixture of hydrogen peroxide, tungstic oxide and/or molybdic oxide, acetic acid, and the olefinic compound to be hydroxylated.

In a preferred method of carrying out the invention, an excess of the olefinic compound in proportion to the hydrogen peroxide is used, because the completion of the reaction is attained thereby more rapidly, whilst the unreacted olefinic compound may be recovered without great difficulty after the hydroxylated reaction product has been separated therefrom. When hydroxylating comparatively unreactive olefins, such as for example n-oct-1-ene, it has on the other hand been found more advantageous to employ an excess of hydrogen peroxide to bring about rapid completion of the reaction. The hydroxylated compound may be isolated in a suitable manner such as fractional distillation, solvent extraction or the like.

The following table gives figures which allow the comparison of the results obtained with tungsten oxide and molybdenum oxide used as catalyst with those obtained with vanadium oxide at ordinary and elevated temperatures. In each case 100 millimols of allyl alcohol were used.

dium oxide and almost completely with tungsten oxide after two hours, and that it took 6.5 hours with molybdenum oxide to bring about the same result. But whilst in the case of vanadium oxide 34% of the alcohol used was converted into undesirable oxidation product and the efficiency of the desired hydroxylation was only 14%, the acid formation with tungsten oxide amounted to only 2.8% of the alcohol used and the efficiency of the production of the hydroxy compound to 82%. The corresponding figures for molybdenum oxide are 9.6% and 72% respectively.

The following examples show how the process of the invention may be carried out in practice.

Example 1

0.10 gram of tungsten tri-oxide was shaken with 12 cc. of hydrogen peroxide "100 volume" containing 104 millimols $H_2O_2$; in a few minutes the trioxide had passed into solution. 5.8 grams allyl alcohol=100 millimols were then added and the solution diluted to 50 cc. with water and heated in a bath at 70° C. After 2 hours the hydrogen peroxide had been consumed and the reaction mixture then contained 1.0 gram (17.2 millimols) of unchanged allyl alcohol and 6.27 grams (68.2 millimols) of glycerol which was recovered by fractional distillation of the reaction mixture. The yield of glycerol represents 82% of the allyl alcohol consumed. Only 2.8 milli-equivalents of acid, mainly formic acid were produced.

Example 2

In the manner similar to Example 1 a mixture of 5.8 grams of allyl alcohol (100 millimols), 6 cc. of hydrogen peroxide "100 volume" (50.7 millimols) and 0.05 gram of tungsten trioxide diluted to 25 cc. with water yielded after maintaining for one hour at 70° C., 3.6 grams (62 millimols) of unchanged allyl alcohol and 3.13 grams (34.0 millimols) of glycerol, representing a yield of 90% of glycerol upon the allyl alcohol consumed.

Example 3

A mixture of 3.6 grams of crotyl alcohol (50 millimols), 6 cc. of hydrogen peroxide "100 volume" (49.8 millimols) and 0.05 gram of tungsten trioxide was made up to 25 cc. with water and yielded in half an hour at 70° C. 0.08 gram (1.1 millimols) of unchanged crotyl alcohol and 4.72 grams (44.5 millimols) of butane-1:2:3 triol representing a yield of 91% upon the crotyl alcohol consumed.

Example 4

To a solution of 0.15 gram of tungsten trioxide in 35 cc. of hydrogen peroxide "100 volume" (279 millimols) prepared as described in Example 1,

| Catalyst | Temp., °C. | Starting quantities | | Time of Reaction | Product (Millimols) | | | | Efficiency on allyl alcohol |
|---|---|---|---|---|---|---|---|---|---|
| | | $H_2O_2$ (millimols) | Catalyst millimols V, W or Mo. | | Unchanged allyl alcohol | Unchanged $H_2O_2$ | Glycerol | Acid (mainly H.COOH) | |
| | | | | | | | | | Percent |
| $V_2O_5$ | 20 | 105 | 1.10 | 20 hr | 93 | 85 | 2.4 | 4.3 | 34 |
| | | | | 6 days | 60 | 0 | 10.4 | 41 | 26 |
| $V_2O_5$ | 70 | 105 | 0.55 | 2 hr | 18 | 0 | 11.7 | 34.4 | 14 |
| $WO_3$ | 20 | 114 | 0.43 | 24 hr | 65 | 79 | 31.8 | trace | 91 |
| | | | | 18 days | 1.2 | 2.0 | 89.4 | 2.2 | 91 |
| $WO_3$ | 70 | 104 | 0.43 | 2 hr | 17.2 | 1.5 | 68.2 | 2.8 | 82 |
| $MoO_3$ | 70 | 92 | 2.78 | 6.5 hr | 24 | 0 | 55.0 | 9.6 | 72 |

From these figures it can be seen that at a temperature of 70° C. the hydrogen peroxide has disappeared completely in the presence of vanawere added 25.2 grams (300 millimols) of crotonic acid and the whole was diluted to 150 cc. with water and heated in a bath at 70° C. After 3½ hours the hydrogen peroxide had been consumed and the reaction mixture then contained 10.8 grams (127 millimols) of unchanged crotonic acid and 16.2 grams (136.2 millimols) of 1:2-dihydroxy-butyric acid representing a yield of 79% on the crotonic acid consumed. After recrystallisation from ethyl acetate the di-hydroxybutyric acid had a melting point of 80° to 81° C.

Example 5

0.2 gram of molybdenum trioxide was suspended in 6 cc. of hydrogen peroxide "100 volume" (45.8 millimols) and after standing for some hours it had all gone into solution. 2.9 grams of allyl alcohol (50 millimols) was then added and the solution diluted to 25 cc. and heated in a bath at 70° C. After 6½ hours the hydrogen peroxide had all been consumed and the reaction mixture then contained 0.7 gram (12.0 millimols) of unchanged allyl alcohol and 2.5 grams (27.5 millimols) of glycerol corresponding to 73% of the allyl alcohol consumed.

Example 6

A mixture of 14.25 cc. of $H_2O_2$ "100-vol." (166.3 millimols), in which had been dissolved 0.2 gram of $WO_3$, 45 cc. of glacial acetic acid, and 11.2 grams (100 millimols) of n-oct-1-ene was stirred mechanically at 70° C. The peroxide had almost disappeared after 1½ hours, after which the mixture was made alkaline with aqueous caustic soda and boiled under reflux for 1 hour, after which treatment it contained 0.27 gram (2.4 millimols) of unchanged octene and 6.3 grams (43.7 millimols) of octane-1:2-diol, which was isolated by extraction of the top layer with ether and had boiling point 137–139°/20 mm., melting point about 25° C. The yield of diol corresponds to 45% on the unrecovered octene.

Example 7

The same quantities as in Example 6 were utilised, but the $H_2O_2$ and acetic acid were heated at 80° C. for 1 hour, and the $WO_3$ then dissolved therein. The solution so prepared was stirred with the octene at 70° C.; after 2–2½ hours most of the peroxide had been consumed. By working up in the same manner as in Example 6 were obtained 3.2 grams (28.5 millimols) of octene and 9.4 grams (65 millimols, 91%) of octanediol.

Example 8

The same quantities as in Example 6, but with addition of 2 drops of conc. $H_2SO_4$ (of about 90–95%), stirred at 70° C.; reaction was complete in 1 hour, and yielded 3.4 grams (30.5 millimols) of octene and 8.5 grams (59.0 millimols, 85%) of octanediol.

Example 9

A mixture of 14.25 cc. $H_2O_2$ "100 volume," in which had been dissolved 0.2 gram of $WO_3$, 45 cc. glacial acetic acid, and 8.2 grams of cyclohexene, was stirred mechanically at 50° C. Reaction was initially rapid, but 10 hours was required for complete consumption of the peroxide. The mixture was worked up as in Example 6, giving 0.22 gram (2.7 millimols) of unchanged cyclohexene and 8.0 grams (69.2 millimols) of trans-cyclohexane-1:2-diol, isolated by repeated extraction with ether, and having boiling point 130–140°/30 mm., melting point 102° C. The yield of diol corresponds to 71% on the unrecovered cyclohexene.

Example 10

The same quantities as in Example 9 were utilised, but the $H_2O_2$ and acetic acid were heated to 80° C. for 1 hour, and the $WO_3$ dissolved therein. The solution so prepared was stirred with the cyclohexene at 50° C.; the initial reaction was extremely rapid, but 5 hours were necessary for completion. By working up in the same manner 1.05 grams (12.8 millimols) of cyclohexene and 7.4 grams (64.5 millimols, 74%) of cyclohexanediol were obtained.

Example 11

The same quantities as in Example 6, but with the addition of 2 drops of conc. $H_2SO_4$ (of 90–95%) were stirred at 50° C.; reaction was steady, and complete in 6¼ hours, and yielded 0.05 gram (0.6 millimols) of cyclohexene and 8.9 grams (76.6 millimols, 77%) of cyclohexanediol.

Example 12

A mixture of 28.5 cc. $H_2O_2$ "100 vol." (284 millimols) and 90 cc. glacial acetic acid were heated to 80° C. for 1 hour, and 0.4 gram of $WO_3$ was then dissolved therein. The solution so prepared was stirred with 19.4 grams (200 millimols) of 3-ethylpent-2-ene at 50° C.; after ½ hour, a large part of the peroxide had been consumed, and the temperature of the mixture was then raised to 70° C. for 3 hours to complete the reaction. By working up in the same manner as described in Example 6 there were obtained 2.3 grams (24 millimols) of unchanged ethylpentene and 19.8 grams (150 millimols) of 3-ethylpentan-2:3-diol, boiling point 200–201° C., representing a yield of 85% on ethylpentene consumed.

It is however to be understood that the invention is not restricted to the olefinic compounds mentioned in these examples, but refers to olefinic compounds in general as defined above.

We claim:

1. Process for the hydroxylation of compounds with one olefinic linkage which comprises forming a solution of the olefinic compound, aqueous hydrogen peroxide and an oxide of a metal selected from the group consisting of tungsten and molybdenum and heating said solution in the presence of sulphuric acid at a temperature between 70° and 100° C. and thereafter separating the formed hydroxylated compound.

2. Process for the hydroxylation of compounds with one olefinic linkage which comprises heating aqueous hydrogen peroxide with acetic acid, adding subsequently thereto an oxide of a metal selected from the group consisting of tungsten and molybdenum and heating the solution thus obtained with the olefinic compound to be hydroxylated at a temperature between 70° and 100° C., and thereafter separating the formed hydroxylated compound.

DONALD PETER YOUNG.

REFERENCES CITED

The following references are of record in the file of this patent:

UNITED STATES PATENTS

| Number | Name | Date |
| --- | --- | --- |
| 2,373,942 | Bergsteinsson | Apr. 17, 1945 |
| 2,414,385 | Milas | Jan. 14, 1947 |